(12) United States Patent
Cheng

(10) Patent No.: US 11,409,373 B2
(45) Date of Patent: Aug. 9, 2022

(54) BACKLIGHT MODULE AND INPUT DEVICE

(71) Applicants: LITE-ON ELECTRONICS (GUANGZHOU) LIMITED, Guangzhou (CN); Lite-On Technology Corporation, Taipei (TW)

(72) Inventor: Ching-Lung Cheng, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 17/322,916

(22) Filed: May 18, 2021

(65) Prior Publication Data
US 2021/0271329 A1    Sep. 2, 2021

Related U.S. Application Data

(63) Continuation of application No. 16/526,980, filed on Jul. 30, 2019, now Pat. No. 11,036,306.

(60) Provisional application No. 62/808,818, filed on Feb. 21, 2019, provisional application No. 62/712,993, filed on Aug. 1, 2018.

(30) Foreign Application Priority Data

Jun. 6, 2019  (CN) .......................... 201910490046.9

(51) Int. Cl.
*G06F 3/02* (2006.01)
*F21V 8/00* (2006.01)

(52) U.S. Cl.
CPC ......... *G06F 3/0202* (2013.01); *G02B 6/0051* (2013.01); *G02B 6/0055* (2013.01)

(58) Field of Classification Search
CPC ... G06F 3/0202; G02B 6/0055; G02B 6/0051; G02B 6/006; G02B 6/005; H01H 2219/066; H01H 2219/062; H01H 2219/056; H01H 2219/06; H01H 2219/044; H01H 13/83
See application file for complete search history.

(56) References Cited

U.S. PATENT DOCUMENTS

| 3,732,389 | A  | * | 5/1973 | Kaelin | H01H 13/702 |
| | | | | | 200/313 |
| 5,664,667 | A  | * | 9/1997 | Kenmochi | H01H 13/702 |
| | | | | | 200/305 |
| 7,294,803 | B2 | * | 11/2007 | Lee | H01H 13/83 |
| | | | | | 200/314 |

(Continued)

*Primary Examiner* — Tsion Tumebo
(74) *Attorney, Agent, or Firm* — JCIPRNET

(57) ABSTRACT

An input device including a bracket, key caps and a black light module is provided. The key caps are disposed on the bracket. The backlight module is disposed under the bracket, and includes a light guide plate, a light source and a shading plate. The light guide plate includes diffusing elements arranged at a position corresponding to an opening of the bracket. The light source is disposed on a side of the light guide plate. The shading plate is disposed on the light guide plate, and includes a transparent sheet, an opaque layer and a translucent coating. The opaque layer is disposed on the transparent sheet correspondingly between two adjacent key caps, and the translucent coating overlaps a portion of the opaque layer on the transparent sheet.

20 Claims, 8 Drawing Sheets

(56) References Cited

U.S. PATENT DOCUMENTS

| | | | | |
|---|---|---|---|---|
| 8,890,014 B1* | 11/2014 | Chen | ................... | G02B 6/0041 |
| | | | | 200/314 |
| 2004/0101662 A1* | 5/2004 | Hikita | .................. | H01H 13/705 |
| | | | | 428/195.1 |
| 2009/0201179 A1* | 8/2009 | Shipman | ............... | G06F 3/0202 |
| | | | | 341/22 |
| 2010/0027293 A1* | 2/2010 | Li | ........................ | G02B 6/0036 |
| | | | | 362/619 |
| 2010/0110724 A1* | 5/2010 | Moncrieff | ............ | G02B 6/0043 |
| | | | | 362/606 |
| 2010/0123606 A1* | 5/2010 | Nishino | ................. | H01H 13/83 |
| | | | | 341/22 |
| 2010/0147661 A1* | 6/2010 | Takeda | ................... | H01H 13/83 |
| | | | | 200/314 |
| 2011/0221617 A1* | 9/2011 | Sellers | ................. | G02B 6/0016 |
| | | | | 341/22 |
| 2012/0217147 A1* | 8/2012 | Porter | ................... | G06F 3/0443 |
| | | | | 200/600 |
| 2013/0093606 A1* | 4/2013 | Chen | ...................... | H01H 13/83 |
| | | | | 341/22 |
| 2013/0134021 A1* | 5/2013 | Chen | ...................... | H01H 13/83 |
| | | | | 200/5 A |
| 2014/0138230 A1* | 5/2014 | Chen | ...................... | H03K 17/98 |
| | | | | 200/5 A |
| 2014/0166455 A1* | 6/2014 | Chen | ...................... | H01H 13/83 |
| | | | | 200/5 A |
| 2015/0021151 A1* | 1/2015 | Chen | ...................... | H01H 13/83 |
| | | | | 200/5 A |
| 2016/0154170 A1* | 6/2016 | Thompson | ............ | B60Q 3/225 |
| | | | | 362/609 |
| 2018/0218859 A1* | 8/2018 | Ligtenberg | .......... | H01H 13/703 |

* cited by examiner

BACKLIGHT MODULE AND INPUT DEVICE

CROSS-REFERENCE TO RELATED APPLICATION

This application is a continuation application of and claims the priority benefit of U.S. application Ser. No. 16/526,980, filed on Jul. 30, 2019, now allowed. The prior U.S. application Ser. No. 16/526,980 claims the priority benefits of U.S. provisional application Ser. No. 62/712,993, filed on Aug. 1, 2018, U.S. provisional application Ser. No. 62/808,818, filed on Feb. 21, 2019, and China application serial no. 201910490046.9, filed on Jun. 6, 2019. The entirety of each of the above-mentioned patent applications is hereby incorporated by reference herein and made a part of this specification.

BACKGROUND

Technical Field

The disclosure relates to a backlight module and an input device, and in particular to a backlight module and an input device with enhanced brightness uniformity.

Description of Related Art

With the development of technology, electronic devices are designed to be lighter and thinner, and creating visual interest is an upward trend. Taking keys as an example, illuminated keys have been developed to increase aesthetics or visibility. In general, the illuminated keys could be obtained by placing a backlight module below key structures. However, a specific area of the illuminated key is particularly brighter due to the arrangement of the backlight module, resulting in uneven brightness and poor visual effects.

SUMMARY

The present disclosure provides a backlight module having a uniform optical effect.

The disclosure provides an input device with an overall improvement in brightness uniformity.

The backlight module of the present disclosure is adapted to be disposed under a plurality of key caps. The backlight module includes a reflector, a light guide plate, a light source, and a shading plate. The light guide plate is disposed on the reflector and having a plurality of diffusing elements. The light source is located on the light incident side of the light guide plate. The shading plate is disposed on the light guide plate, wherein the shading plate has a shading area and a translucent area. The diffusing elements are arranged corresponding to the translucent area, wherein a transmittance of the translucent area is greater than a transmittance of the shading area, and a plurality of scattering or diffusion particles are arranged in the translucent area.

In an embodiment of the disclosure, the shading plate includes a translucent sheet and an opaque layer coated on the translucent sheet, wherein the shading area corresponds to a portion of the translucent sheet covered by the opaque layer, and the translucent area corresponds to a portion of the translucent sheet not covered by the opaque layer. The translucent sheet is a white or whitish polymer film.

In an embodiment of the disclosure, the shading plate includes a transparent sheet, and an opaque layer and a translucent coating respectively coated on the transparent sheet, wherein the shading area corresponds to a portion covered by the opaque layer, and the translucent area corresponds to a portion covered by the translucent coating but not covered by the opaque layer.

In an embodiment of the disclosure, the diffusing elements include at least one concave-convex microstructure or at least one dent, disposed on a bottom surface or a top surface of the light guide plate corresponding to the plurality of key caps.

In an embodiment of the disclosure, the shading plate has at least one opening located below a gap between two adjacent key caps or disposed at a boundary between the shading area and the translucent area.

In an embodiment of the disclosure, the transmittance of the translucent area is between 50% and 70%.

The input device of the present disclosure includes a bracket, a circuit film, a key cap, and a connecting component and a backlight module. The bracket has at least one opening. The circuit film is disposed on the bracket. The key cap is disposed on the circuit film. The connecting component is disposed between the key cap and the bracket. The backlight module is disposed under the bracket. The backlight module includes a reflector, a light guide plate, a light source, and a shading plate. The light guide plate is disposed on the reflector and includes a plurality of diffusing elements. The light source is located on the light incident side of the light guide plate. The shading plate is disposed on the light guide plate and having a shading area and a translucent area, wherein a coverage of the translucent area at least overlaps a portion of the diffusing elements, and the transmittance of the translucent area is less than 80%.

In an embodiment of the disclosure, the shading plate includes a translucent sheet and an opaque layer coated on the translucent sheet, the transmittance of the translucent sheet is between 50% and 70%, the transmittance of the translucent sheet is greater than the transmittance of the opaque layer. The shading area is a portion covered by the opaque layer, and the translucent sheet is a flexible polymer film containing a plurality of scattering or diffusion particles.

In an embodiment of the disclosure, the shading plate includes a transparent sheet, and an opaque layer and a translucent coating respectively coated on the transparent sheet, wherein the shading area is a portion covered by the opaque layer, and the translucent area is a portion covered by the translucent coating but not covered by the opaque layer. The transmittance of the translucent area is less than a transmittance of the transparent sheet.

In an embodiment of the disclosure, the key cap has a light transmitting portion, corresponding to a portion of the diffusing elements, the translucent area of the shading plate, the opening of the bracket, and the light transmitting portion of the key cap.

In an embodiment of the disclosure, the diffusing elements include concave-convex microstructures or dents, disposed on the bottom surface or the top surface of the light guide plate corresponding to the key cap.

In an embodiment of the disclosure, one of the diffusing elements include a first microstructure and a second microstructure integrally connected to each other, the first microstructure is located on a periphery of the second microstructure, and a first thickness of the light guide plate at the first microstructure is different from a second thickness of the light guide plate at the second microstructure.

In an embodiment of the disclosure, the translucent area has a white or whitish color, and the key cap comprises a light-colored coating.

The input device of the present disclosure includes a bracket, a circuit film, a key cap and a backlight module. The circuit film is disposed on the bracket. The key cap is disposed on the circuit film. The backlight module is disposed underneath the bracket. The backlight module includes a light guide plate, a shading plate and a light source. The light guide plate includes a plurality of diffusing elements. The shading plate is disposed on the light guide plate. The shading plate includes a translucent film made of a polymer containing a plurality of scattering or diffusion particles. The light source is adjacent to the light guide plate.

In an embodiment of the disclosure, the translucent film is semi-transparent or whitish.

Based on the above, the backlight module of the present disclosure is disposed under the key structure, and the shading plate of the backlight module has a translucent area to soften the light and blur the edges of the diffusing elements, thereby mitigating the over-brightness problem arised in the area corresponding to the diffusing elements. In this way, it is possible to avoid the nonuniform brightness due to the arrangement of the light source and/or the diffusing elements. Therefore, the backlight module and the input device of the present disclosure can achieve an improved optical effect with the delivery of uniform backlighting.

In order to make the aforementioned features and advantages of the disclosure more comprehensible, embodiments accompanying figures are described in detail below.

BRIEF DESCRIPTION OF THE DRAWINGS

The accompanying drawings are included to provide a further understanding of the disclosure, and the drawings incorporated into the specification constitute a part of the specification. The accompanying drawings illustrate embodiments of the present disclosure and, together with the description, serve to explain the principle of the present disclosure.

DESCRIPTION OF THE EMBODIMENTS

Figure 1:
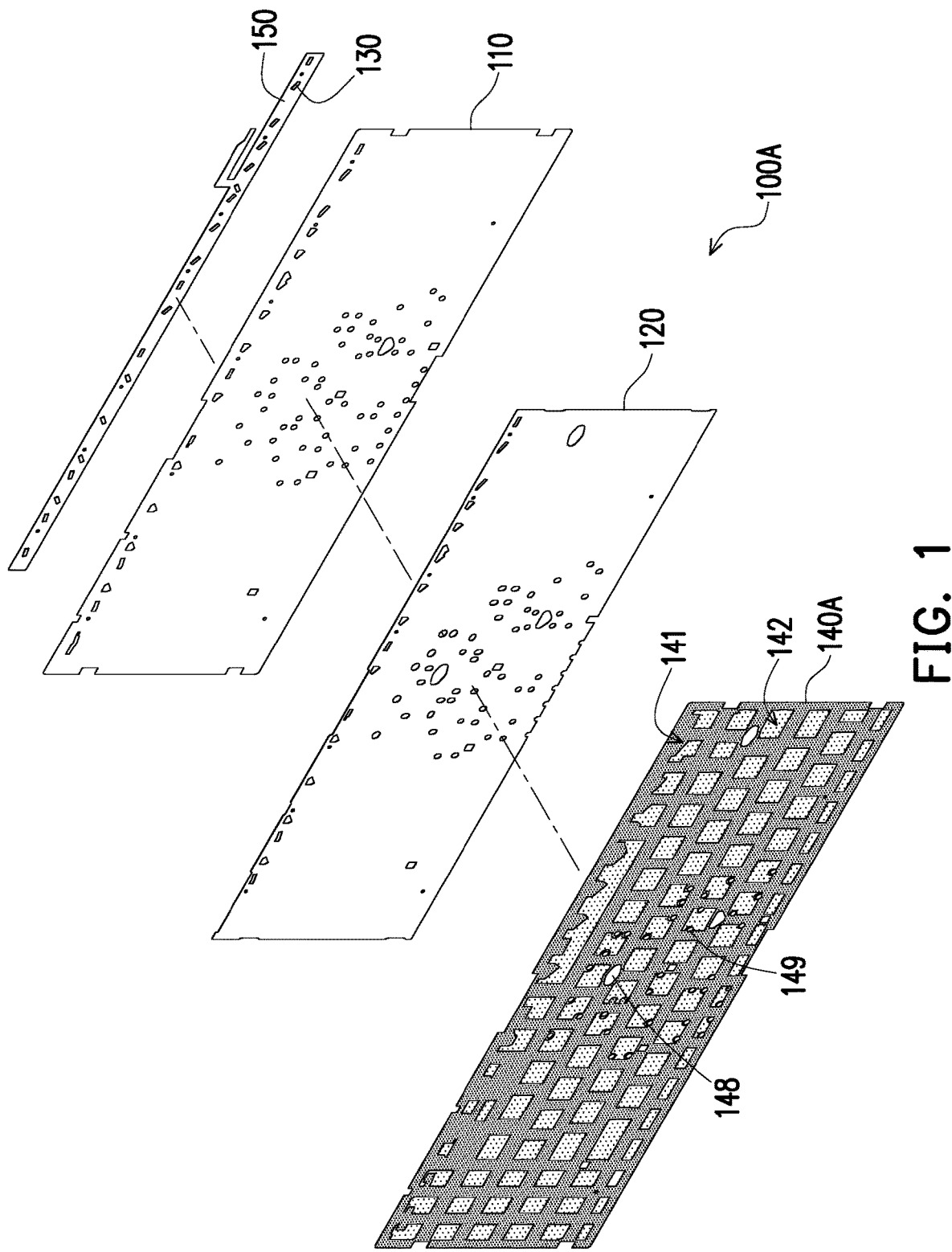
FIG. 1 is a schematic exploded view of a backlight module according to an embodiment of the disclosure.

Reference will now be made in detail to the exemplary embodiments of the present disclosure. Examples of the exemplary embodiments are illustrated in the accompanying figures. Whenever possible, the same reference symbols are used in the drawings and descriptions to denote the same or similar parts.

In embodiments of the disclosure, the backlight module of the illuminated keyboard includes a shading plate to block unwanted light. The shading plate is a light transmitting material coated with a dark-colored coating thereon to define the shading areas from the light transmitting areas which light can pass through. As the light transmitting areas are spaced apart from the light source in different distances, the brightness of the light emitted from the backlight module is nonuniform. Some of the light transmitting areas closer to the light source provide brighter luminance, and some of the light transmitting areas relatively far from the light source provide lower luminance. Therefore, the backlight module further includes a plurality of diffusing elements for distributing the light uniformly over a light guide plate. However, light extraction or diffusion properties of the diffusing elements could have the distribution of the diffusing elements visible to the naked eye, and causes the illuminated keyboard to reveal the particularly brighter areas corresponding to the diffusing elements, which affects the aesthetics and visual effects. A variety modification of backlight modules will be provided below to illustrate how to improve the overall illumination uniformity and the backlighting effect of the illuminated keyboard.

Figure 2A:
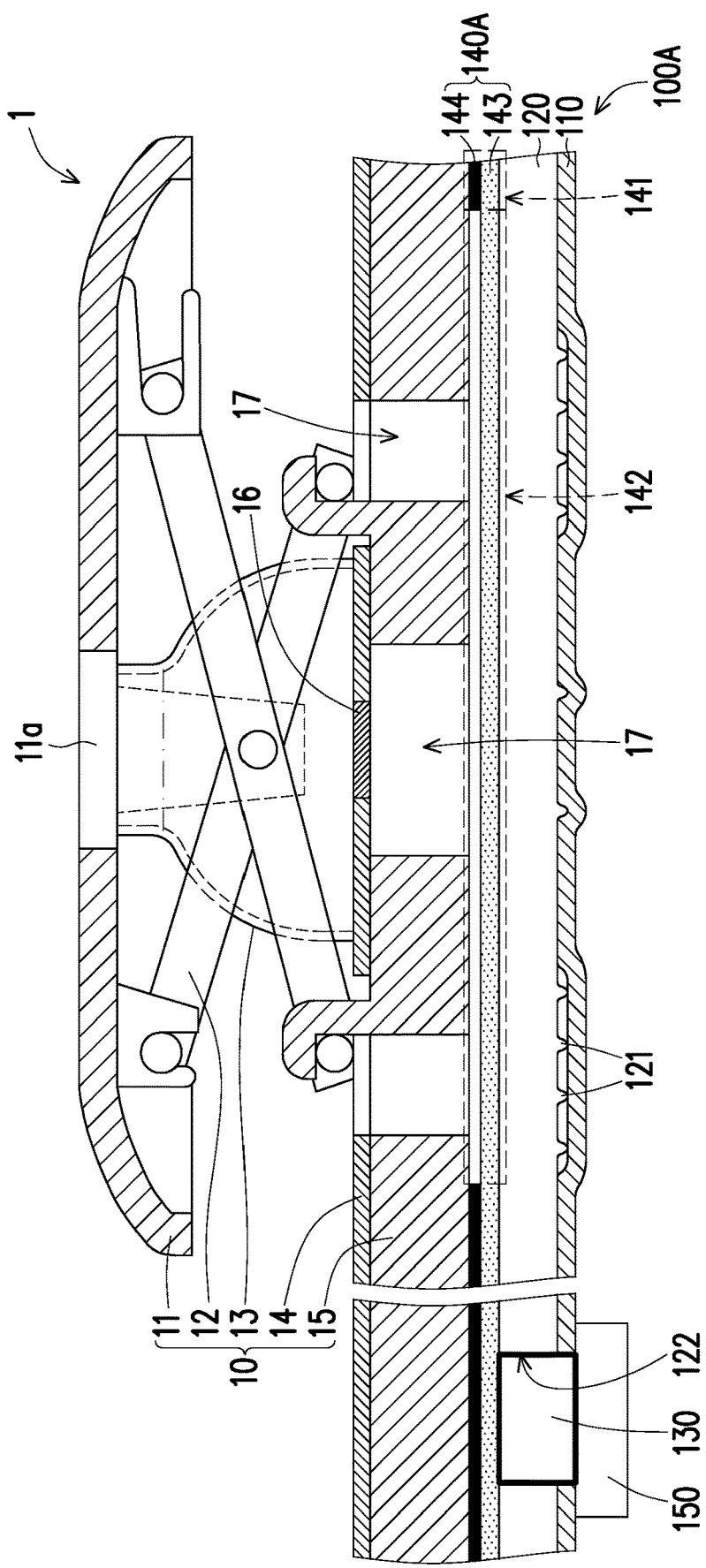
FIG. 2A is a schematic cross-sectional view showing the backlight module of FIG. 1 applied to an input device.

FIG. 1 is a schematic exploded view of a backlight module according to an embodiment of the disclosure. FIG. 2A is a schematic cross-sectional view showing the backlight module of FIG. 1 applied to an input device. In order to clearly show the detailed structure of the backlight module, in FIG. 2A, the relationship in size among elements contained in the input device 1 and the backlight module 100A is merely illustrative, and the disclosure is not limited thereto.

Referring to FIG. 1 and FIG. 2A, the backlight module 100A is applied to the input device 1, for example. In this embodiment, the input device 1 is a keyboard, which includes multiple key structures 10 and the backlight module 100A. However, in other embodiments, the input device 1 may be a key or button with illumination, which should not be construed as a limitation to the type of the input device 1. Only one key structure 10 is schematically illustrated in FIG. 2A, but the number of key structures 10 is not limited thereto. In addition, the backlight module 100A is not limited to be applied to the key structure which connects the key caps through a scissors-type structure as shown in FIG. 2A.

As shown in FIG. 2A, the key structure 10 includes a key cap 11, a connecting component 12, an elastic body 13, a circuit film 14, and a bracket 15. The bracket 15 is disposed on the backlight module 100A. In this embodiment, the bracket 15 may have at least one opening 17 for the light of the backlight module 100A to pass through, but the bracket 15 is not limited to this configuration. The circuit film 14, the elastic body 13, the connecting component 12, and the key cap 11 are disposed on the bracket 15. The circuit film 14 is disposed between the key cap 11 and the bracket 15, and is provided with a conductive portion 16 as a switch. The elastic body 13 is disposed on the circuit film 14 corresponding to the conductive portion 16, for example. The key cap 11 is disposed on the elastic body 13 and connected to the bracket 15 through the connecting component 12. The respective ends of the connecting component 12 movably and pivotally connect the bracket 15 and the key cap 11, so that the key cap 11 can stably move up and down relative to the bracket 15. In this embodiment, the connecting component 12 includes two frames assembled in a scissors-like structure, but is not limited thereto.

The elastic body 13 disposed between the key cap 11 and the circuit film 14 could be aligned with the conductive portion 16 of the circuit film 14. When the key cap 11 is pressed, the elastic body 13 is pressed and temporarily deformed, thereby enabling a protrusion of the elastic body 13 to move down and touch the circuit film 14, so as to trigger the switch (conductive portion 16) to generate an input signal. Once the applied force is removed from the key cap 11, the restoring force of the elastic body 13 drives the key cap 11 move upwards to return to the original released position. In the embodiment, the key cap 11 is provided with a light transmitting portion 11a for the light emitted from the backlight module 100A to pass through, so as to obtain an illuminated key.

As shown in FIG. 1 and FIG. 2A, the backlight module 100A is adapted to be disposed under the key structure 10. The backlight module 100A includes a reflector 110, a light guide plate 120, a light source 130, and a shading plate 140A. The light guide plate 120 is disposed on the reflector 110. The shading plate 140A is disposed on the light guide plate 120. The light source 130 is located on a light incident side 122 of the light guide plate 120. In this embodiment, the light source 130 is a side-view LED facing the light incident side 122. The light emitted by the light source 130 enters the interior of the light guide plate 120 from the light incident side 122 to be distributed over the light guide plate 120, until the light is emitted out from the top surface of the light guide plate 120, for example, toward the key structure 10. With the arrangement of the reflector 110 under the light guide plate 120, the light emitted from the bottom surface of the light guide plate 120 could be reflected back into the light guide plate 120, such that the reflector 110 can reduce the loss of light from the bottom of the light guide plate 120 and distribute the light uniformly. The reflector 110 is, for example but not limited thereto, made of polyethylene terephthalate (PET) doped with a reflecting material, or is a PET film coated with a reflecting coating on the surface facing the light guide plate 120.

The light guide plate 120 is provided with a plurality of diffusing elements 121 for uniformly distributing the light emitted from the light source 130 and extracting the light out of the light guide plate 120. The diffusing elements 121 include at least one, for example, concave-convex microstructure or dent corresponding to the key cap 11. Further, some diffusing elements 121 are arranged at a position corresponding to the opening 17 of the bracket 15. The traveling direction and path of the light could be adjusted by varying the position and density of the diffusing elements 121, so as to direct or diffuse the light to a desired area, for example, to the light transmitting portion 11a of the key cap 11. Thus, the direction where the light is emitted out of the key structure 10 can be well controlled. As shown in FIG. 2A, in the embodiment, the diffusing elements 121 disposed on the bottom surface of the light guide plate 120 could be microstructures protruding from the bottom surface of the light guide plate 120. In other embodiments, the diffusing elements 121 may be dents or dots recessed in the bottom surface of the light guide plate 120. For example, the diffusing elements 121 could be microstructures that is curved inward the bottom surface of the light guide plate 120 (toward the interior of the light guide plate 120), which should not be construed as a limitation to the disclosure. The diffusing elements 121 are formed by, for example, roll-to-roll processing to transfer a pattern of the mold to the bottom of the light guide plate 120, thereby forming microstructures with the profile in protuberances, hollow cavities, or a combination thereof which can change optical properties. In another embodiment, the diffusing elements 121 could be formed by performing screen printing on the bottom surface of the light guide plate 120 to form optical diffusing dots. In addition, the diffusing element 121 may also be formed by directly patterning the bottom surface of the light guide plate 120 through laser engraving to form microstructures or microlenses. Although the diffusing elements 121 of the above embodiments are exemplified as being disposed at the bottom of the light guide plate 120, in other embodiments, the diffusing elements 121 could be disposed at the top of the light guide plate 120 by, for example but not limited thereto, protruding from the top surface of the light guide plate 120 or curved inward the top surface of the light guide plate 120.

Figure 2B:
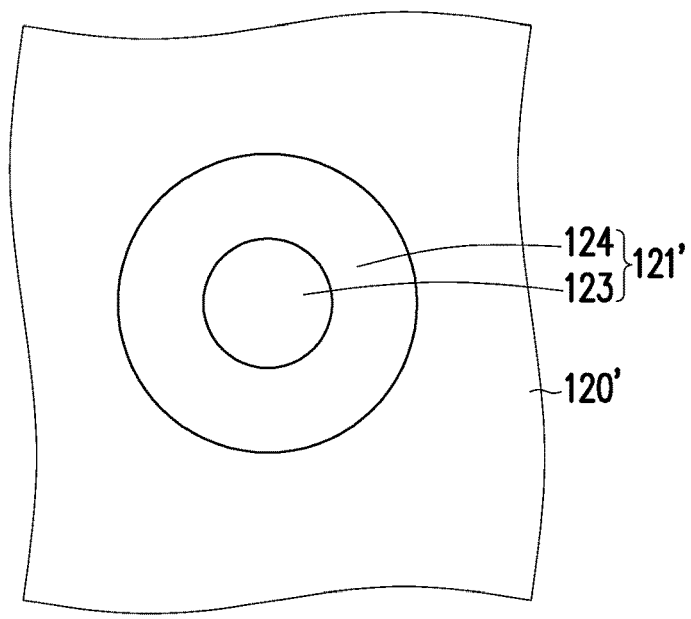
FIG. 2B is a schematic bottom view of a diffusing element according to an embodiment of the disclosure.
Figure 2C:
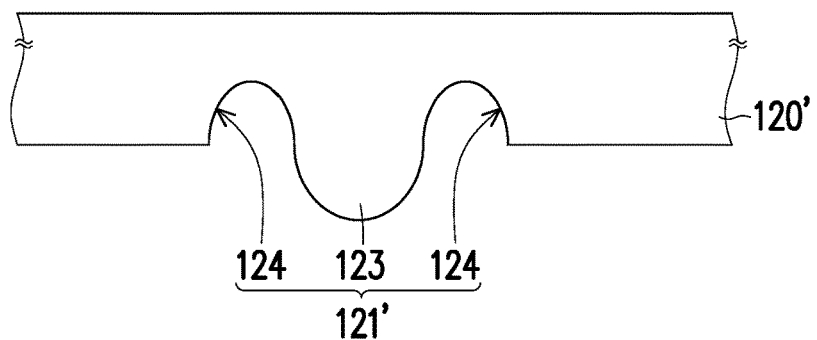
FIG. 2C is a schematic cross-sectional view of the diffusing element of FIG. 2B.
Figure 2D:
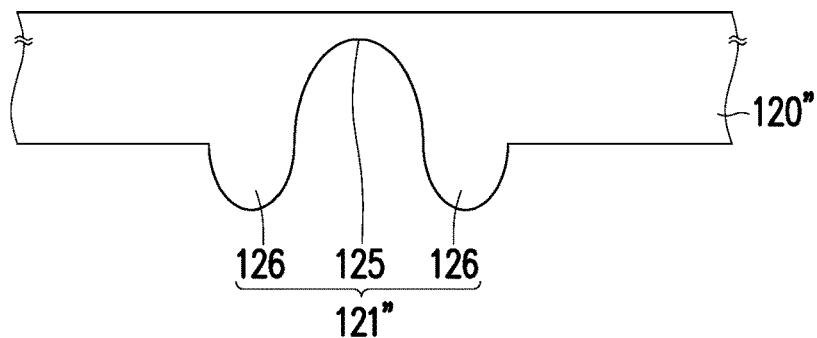
FIG. 2D is a schematic cross-sectional view of a diffusing element according to an embodiment of the disclosure.

The shape, depth, density and position of the diffusing element 121 formed on the light guide plate 120 may vary depending on optical requirements. Specifically, the diffusing element 121 is, for example, a concave-convex microstructure having a dot-shaped, V-shaped, column-shaped, tapered-shaped (e.g., cone or pyramid) contours, or a combination of the above contours. In an embodiment, the single diffusing element 121 may include a concave portion and a convex portion connected to each other. FIG. 2B is a schematic bottom view of a diffusing element according to an embodiment of the disclosure. FIG. 2C is a schematic cross-sectional view of the diffusing element of FIG. 2B. Referring to FIG. 2B and FIG. 2C, a diffusing element 121' located on the bottom surface of a light guide plate 120' includes a first microstructure 124 and a second microstructure 123 integrally connected to each other, and the first microstructure 124 is located on a periphery of the second microstructure 123. The plate thickness of the light guide plate 120' at the first microstructure 124 is different from that at the second microstructure 123. More specifically, the second microstructure 123 is a protrusion located in the substantial center of the diffusing element 121', and the first microstructure 124 disposed around the second microstructure 123 is a recess or cavity surrounding the protrusion. Therefore, the second thickness of the light guide plate 120' at the second microstructure 123 is greater than the first thickness of the light guide plate 120' at the first microstructure 124, and the plate thickness of the light guide plate 120' where the diffusing element 121' is not arranged is between the second thickness and the first thickness. FIG. 2D is a schematic cross-sectional view of a diffusing element according to an embodiment of the disclosure. Referring to FIG. 2D, the difference between FIG. 2D and FIG. 2C is that, in a light guide plate 120" of this embodiment, a second microstructure 125 of a diffusing element 121" is a recess located in the substantial center, and the first microstructure 126 is a protrusion surrounding the recess.

When the light emitted by the light source 130 enters the light guide plate 120 and is transmitted from the light incident side 122 to another side compliant with the total internal reflection, the optical path would be changed through the diffusing elements 121 that diffuse or interrupt the light, which may cause the problem that the excessive brightness at the diffusing elements 121. Referring to FIG. 1 and FIG. 2A, a shading plate 140A of the embodiment disposed on the light guide plate 120 has a shading area 141 and a translucent area 142. The translucent area 142 allows the light to pass through, and the transmittance of the translucent area 142 is greater than the transmittance of the shading area 141. The translucent area 142 is disposed corresponding to each of the key caps 11, and therefore the translucent area 142 is surrounded by the shading area 141. The opaque shading area 141 is, for example, correspondingly disposed between the two adjacent key caps 11 to shade the area no need to be illuminated to avoid light leakage. In this way, the shading plate 140A can selectively allow the light to pass through the specific area corresponding to the translucent area 142 and illuminate on the rear surface of the key cap 11 through the opening 17 of the bracket 15. In addition, as shown in FIG. 1, the shading plate 140A further has at least one opening 148 and opening 149 configured for the engagement or combination with the reflector 110 and the light guide plate 120, or for heat dissipation. The opening 148 is disposed, for example, below a gap between the two adjacent key caps 11 (e.g., corresponding to the shading area 141), and the opening 149 is disposed, for example, at a boundary between the shading area 141 and the translucent area 142. Thus, the openings 148 and 149 do not affect the backlighting effect of the key cap 11.

In this embodiment, the distribution of the diffusing elements 121 corresponds to the translucent area 142, and the transmittance of the translucent area 142 is less than 80%. Specifically, the transmittance of the translucent area 142 is between 50% and 70%, so the translucent area 142 is not transparent but allows the light to pass through. In an embodiment, the coverage of the translucent area 142 at least overlaps a portion of the diffusing elements 121, or the coverage of the translucent area 142 is greater than the distribution range of the diffusing elements 121. If the transmittance of the translucent area 142 is greater than 80% and is transparent, the effect of blurring the diffusing elements 121 is not obtained. In that case, the contours of the diffusing elements 121 are visible to the naked eye. If the transmittance of the translucent area 142 is less than 50%, the ratio of light passing through the translucent area 142 is too low, which damages the backlighting effect of the key structure 10. By adjusting the ratio between the intensity of the transmitted light after passing through the translucent area 142 and the intensity of the incident light before passing through the translucent area 142 (e.g., the transmittance of the translucent area 142), the light passing through the translucent area 142 can be softened, especially at the position corresponding to the diffusing elements 121, so that the brightness of the light is uniform over the light guide plate 120, thereby solving the problem that the light is too bright at the position corresponding to the diffusing elements 121.

The shading plate 140A includes a translucent sheet 143 and an opaque layer 144 coated on the translucent sheet 143. The shading area 141 is a portion of the translucent sheet 143 covered by the opaque layer 144, and the remaining portion is the translucent area 142. The translucent sheet 143 is a flexible and colored polymer film made of a thermoplastic polymer (e.g., polyester, polyamine or the like) composition having a transmittance of less than 80%. In an embodiment, the translucent sheet 143 could be a diffusing film made of polyethylene terephthalate (PET), polyimide (PI) or polycarbonate (PC) having a transmittance of between 50% and 70%, but is not limited to thereto. It should be noted that the translucent sheet is understood to mean a film that is not fully transparent nor colorless to human sight, and which has a white, whitish, light or bright color. By making a polymer composition containing some diffuser particles, pigments or dyes, a whitening effect could be given to the translucent sheet, and therefore, the translucent but not transparent sheet 143 may be a white-colored sheet doped with dispersed scattering or diffusion particles or other light- or bright-colored sheets. In another embodiment, the translucent sheet could be a crystalline polymer film that appears semi-transparent or whitish. In addition, the opaque layer 144 corresponding to the shading area 141 is an opaque ink, e.g., a black paint, that can be applied on the surface of the translucent sheet 143 to prevent light from being emitted out from the shading area 141. In an embodiment, a reflecting ink (such as white paint) may be further included between the opaque layer 144 and the translucent sheet 143, and the light that exits the light guide plate 120 where the reflecting ink is arranged (i.e., corresponding to the shading area 141) can be reflected back into the light guide plate 120 by the reflecting ink under the opaque layer 144. The configuration of the shading area 141 as well as the type and color of the opaque layer 144 and the reflecting ink are not limited thereto.

In this embodiment, the light emitted by the light source 130 enters the light guide plate 120 from the light incident side 122, and is then emitted from the backlight module 100A via the top surface of the light guide plate 120 and the translucent area 142 of the shading plate 140A, and is directed toward the key structure 10 through the opening 17 of the bracket 15. Since the translucent area 142 which is not fully transparent has a specific transmittance and transparency, the intensity of the incident light before passing through the translucent area 142 is greater than that of the transmitted light after passing through the translucent area 142. That is to say, the light emitted from the light guide plate 120 does not completely pass through the translucent area 142. Therefore, the light corresponding to the diffusing elements 121 can be softened through the translucent area 142 to make the edges of the diffusing elements 121 vague and to provide a uniform optical effect.

Furthermore, the light transmitting portion 11a of the key cap 11 is light transmissive, and is formed by, for example, coating a titanium oxide layer on the key cap 11 and then coating an opaque ink layer on the titanium oxide layer. Thereafter, a portion of the opaque ink layer is removed through laser engraving, and the light transmitting portion 11a is formed at the portion with no opaque ink covering. Since the titanium oxider can blur or scatter the light, the light transmitting portion 11a with the titanium oxide layer can further improve the backlighting uniformity for the key cap 11 having a light-colored coating. Certainly, the material and the fabricating method of the light transmitting portion 11a are not limited thereto.

In addition, the backlight module 100A further includes a flexible circuit board 150 which is located below the reflector 110, such that the reflector 110 is located between the flexible circuit board 150 and the light guide plate 120. The light source 130 is disposed on the flexible circuit board 150 and electrically connected to the flexible circuit board 150. The light source 130 is coupled to the power supply through the flexible circuit board 150, so that the power can be supplied to the light source 130. In this embodiment, the light source 130 is disposed adjacent to the light guide plate 120 in the manner of upward extending from the flexible circuit board 150 through openings of the reflector 110 and the light guide plate 120. Therefore, the light emitted by the light source 130 can enter the light guide plate 120 from the light incident side 122 of the light guide plate 120. In other embodiments, if the light source 130 and conductive wires for supplying power thereto are disposed on the reflector 110, the light guide plate 120 or the shading plate 140A, the flexible circuit board 150 and the opening of the reflector 110 for the light source 130 to pass through are no longer required.

Figure 3:
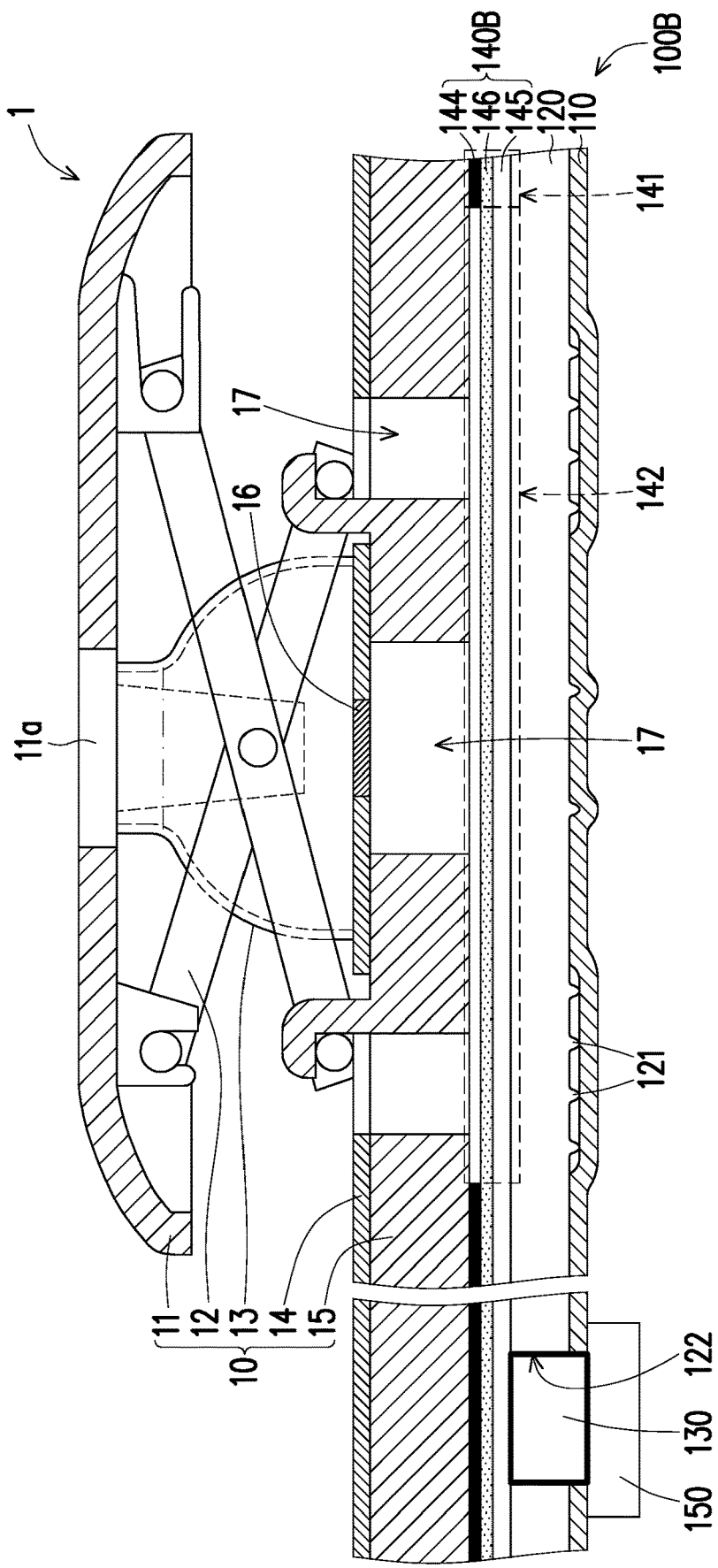
FIG. 3, FIG. 4, and FIG. 5A are schematic cross-sectional views showing a backlight module applied to an input device according to other embodiments of the present disclosure.
Figure 4:
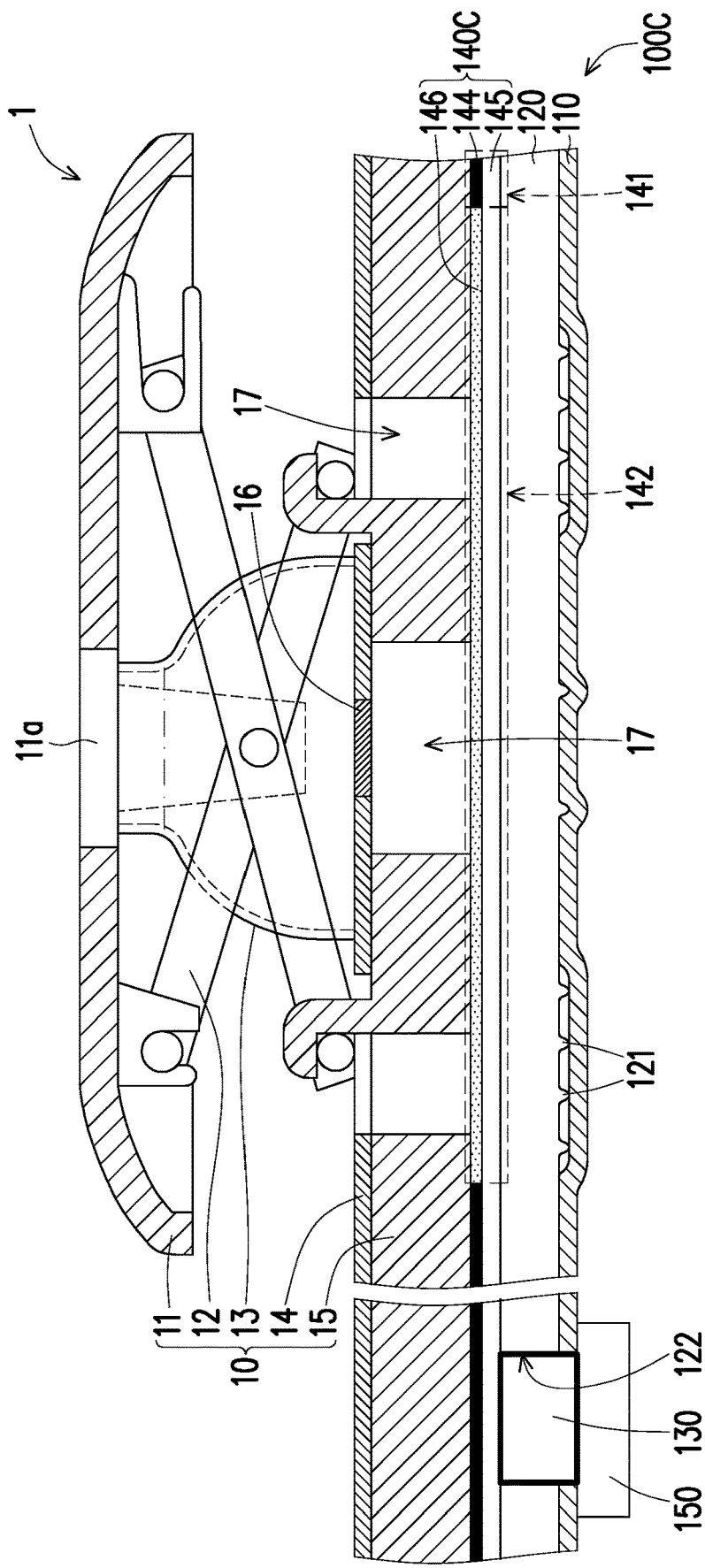
Figure 5A:
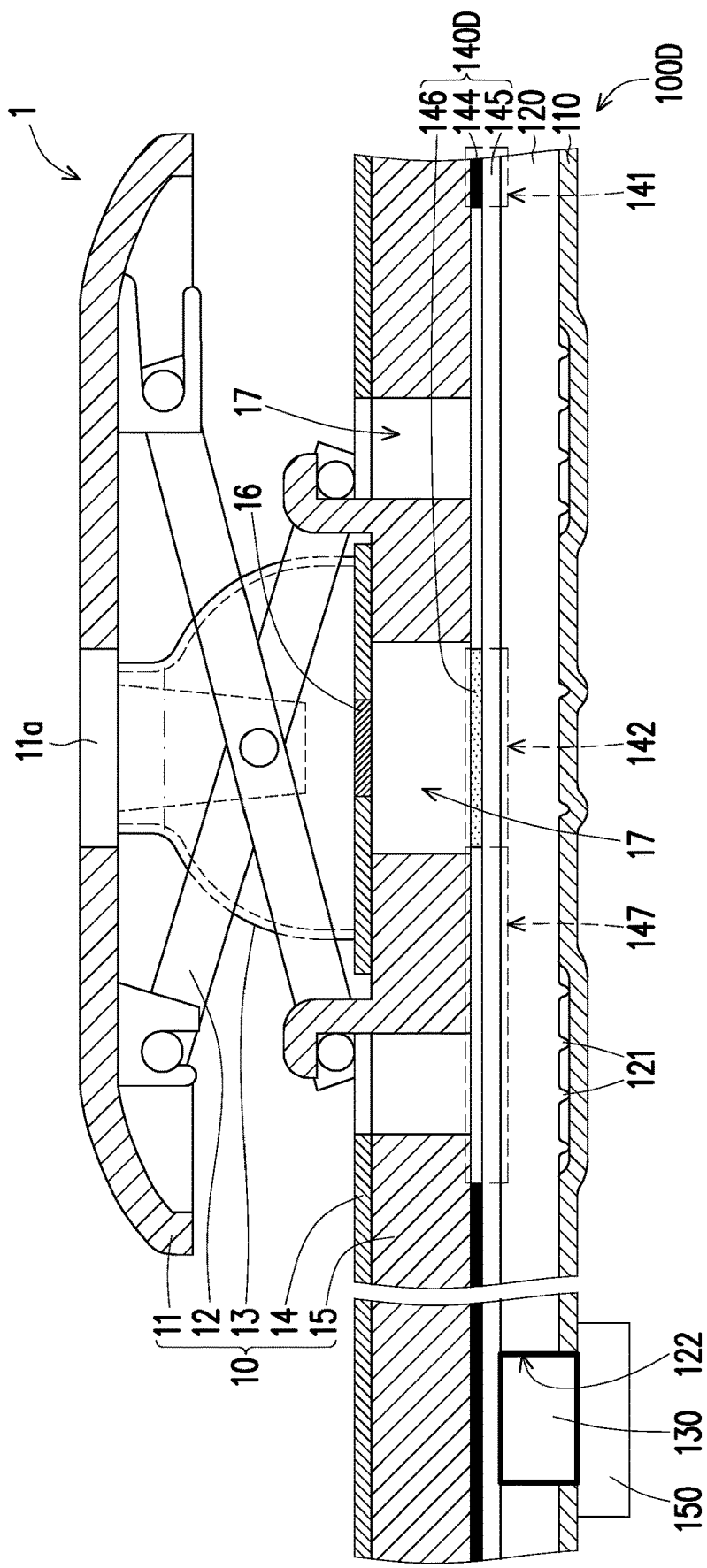

FIG. 3, FIG. 4, and FIG. 5A are schematic cross-sectional views showing a backlight module applied to an input device according to other embodiments of the present disclosure. It is to be noted that the following embodiments adopt the reference numbers and parts of the foregoing embodiments, wherein the same reference numerals are used to denote the same or similar components, and the description concerning the same technical content is omitted. For the description of the omitted part, reference may be made to the foregoing embodiment, and no repetition will be incorporated below. In order to clearly show the detailed structure of the backlight module, in FIG. 3, FIG. 4, and FIG. 5A, the relationship in size of components in the backlight modules 100B, 100C, and 100D is merely illustrative, and not limited thereto.

Referring to FIG. 3, in the embodiment, the backlight module 100B is slightly different from the backlight module 100A of FIG. 2A. The difference is that the backlight module 100A of FIG. 2A includes the translucent sheet 143 coated with the opaque layer 144 to form the shading area 141, and the remaining portion of the translucent sheet 143 not coated with the opaque layer 144 serves as the translucent area 142. The shading plate 140B of the present embodiment is formed by disposing a translucent coating 146 on a transparent sheet 145 to cover the overall transparent sheet 145, and then disposing the opaque layer 144 on a specific area of the translucent coating 146. The portion covered by the opaque layer 144 forms the shading area 141, and the area where the opaque layer 144 is not provided is the translucent area 142. The transparent sheet 145 could be a transparent and colorless polyester film such as polyethylene terephthalate (PET) film. The translucent coating 146 is, for example but not limited thereto, a white- or light-colored paint, such that the transparent sheet 145 coated with the translucent coating 146 (i.e., corresponding to the translucent area 142) can have the transmittance of less than 80%, or preferably between 50% and 70%.

Referring to FIG. 4, in the embodiment, the backlight module 100C is slightly different from the backlight module 100B of FIG. 3, and the difference is that the translucent coating 146 of the shading plate 140B of FIG. 3 is coated on the whole transparent sheet 145, and the opaque layer 144 is specifically coated on the translucent coating 146 corresponding to the shading area 141. The opaque layer 144 of the shading plate 140C of the present embodiment is directly coated on a designated area of the transparent sheet 145, and the translucent coating 146 is directly coated on the remaining area of the transparent sheet 145 not covered by the opaque layer 144 to adjust the transmittance of the transparent sheet 145 less than 80%, or preferably between 50% and 70%. That is, the opaque layer 144 and the translucent coating 146 are respectively coated on the surface of the transparent sheet 145 corresponding to the shading area 141 and the translucent area 142, and therefore the configuration of the embodiment can reduce the amount of the translucent coating 146 and decrease the thickness of the shading plate 140C.

Referring to FIG. 5A, in the embodiment, the backlight module 100D is slightly different from the backlight module 100C of FIG. 4, and the difference is that the translucent coating 146 of the shading plate 140C of FIG. 4 is fully coated on the remaining transparent sheet 145 not covered by the opaque layer 144. As the translucent area 142 of the shading plate 140D of the present embodiment, the translucent coating 146 is merely arranged on a portion of the transparent sheet 145 not covered by the opaque layer 144, and the another portion of the transparent sheet 145 not covered by the opaque layer 144 and the translucent coating 146 is the transparent area 147. Therefore, the shading plate 140D can be divided into three areas of different transmittances, wherein the transmittance of the transparent area 147 is greater than that of the translucent area 142, and meanwhile, the transmittance of the translucent area 142 is greater than that of the shading area 141. In another embodiment, the transparent sheet 145 may be partially removed to form a hollow portion on the shading plate 140D, which serves as the transparent area 147.

Figure 5B:
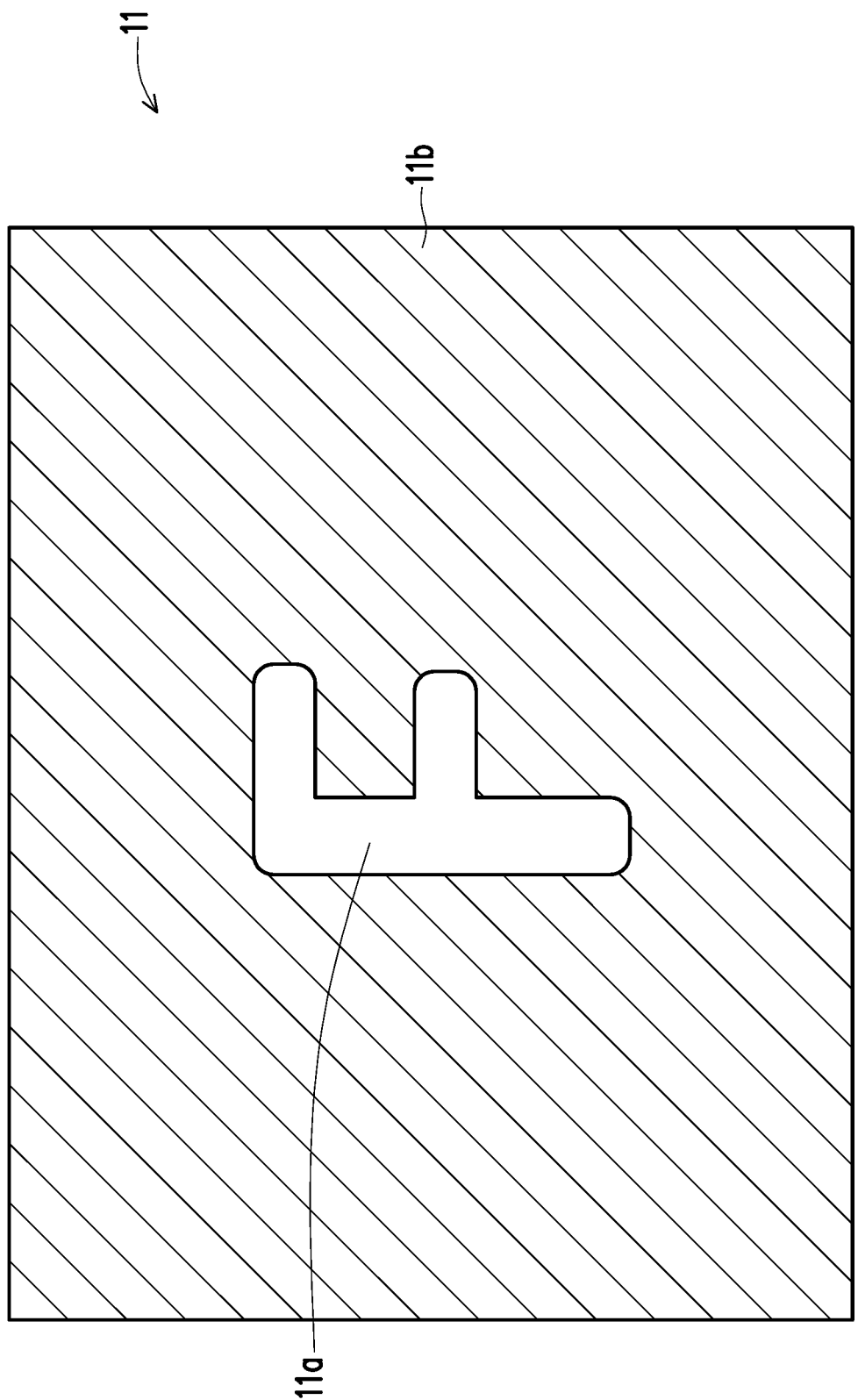
FIG. 5B is a schematic top view of the key cap of FIG. 5A.
Figure 5C:
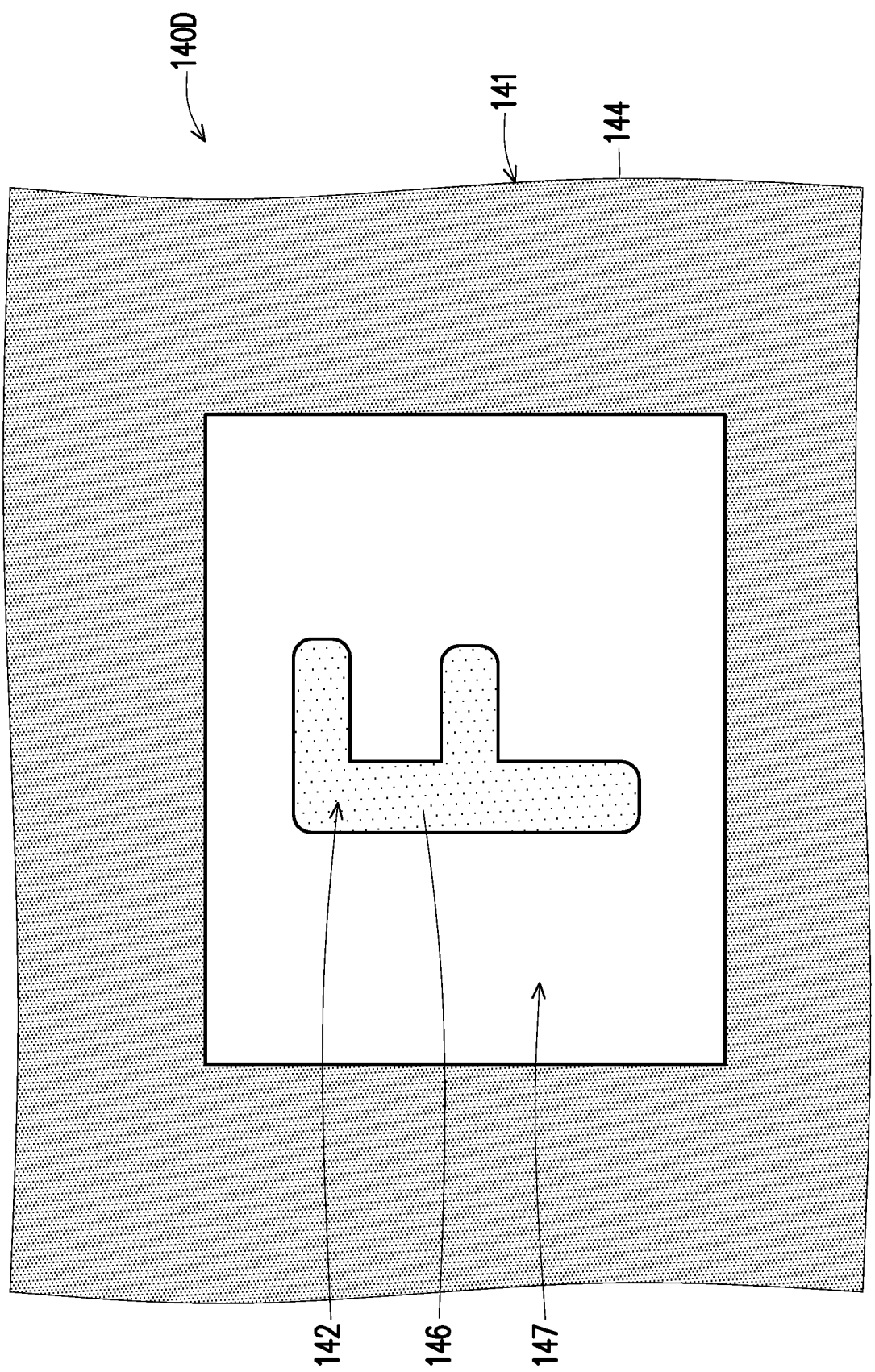
FIG. 5C is a schematic top view of a shading plate of FIG. 5A.

FIG. 5B is a schematic top view of the key cap of FIG. 5A. FIG. 5C is a schematic top view of the shading plate of FIG. 5A. Referring to FIG. 5A to FIG. 5C, the key cap 11 includes a light transmitting portion 11a and a light shielding portion 11b. The light transmitting portion 11a is defined by, for example, at least one character represented by each key, and the light can pass through the transparent or translucent character area for the user to recognize. In the present embodiment, the translucent area 142 of the shading plate 140D is configured corresponding to the light transmitting portion 11a of the key cap 11. The coating position, size and shape of the translucent coating 146 of the shading plate 140D could be arranged based on the position, size and shape of the corresponding light transmitting portion 11a. In other embodiments, it would suffice to achieve an enhanced optical performance that the translucent area 142 is at least disposed below the light transmitting portion 11a of the key cap 11.

Since the coverage of the translucent area 142 corresponds to the distribution of the diffusing elements 121, the light passing through the translucent area 142 with the specific transmittance could be modified to be displayed by the light transmitting portion 11a, so that the arrangement and outlines of the diffusing elements 121 can become unclear and invisible. In this manner, it is possible to prevent the user from seeing the distribution of the diffusing elements 121 through the light transmitting portion 11a, thereby improving the brightness uniformity of the light emitted from the key cap 11. In addition, since the translucent area 142 and the light transmitting portion 11a are arranged correspondingly, the light passing through the light transmitting area 147 of the shading plate 140D can be blocked by the light shielding portion 11b of the key cap 11, and thus the optical effect of the illuminated key is not affected.

In summary, the backlight module of the present disclosure is adapted to be disposed under the key structure, and the shading plate of the backlight module has a translucent area to achieve the effect of softening light and blurring the contours of the diffusing elements, thereby improving the problem of over-brightness at the position corresponding to the diffusing elements. In this way, the nonuniform brightness due to configuration of the diffusing elements can be mitigated. Therefore, the backlight module and the input device of the present disclosure can achieve an optical effect with uniformity and aesthetics.

Finally, it should be noted that the above embodiments are merely illustrative of the technical solutions of the present disclosure, and are not intended to be limiting. Although the present disclosure has been described in detail with reference to the foregoing embodiments, those skilled in the art will understand that the technical solutions described in the foregoing embodiments may be modified, or some or all of the technical features may be equivalently replaced; and the modifications or replacement do not deviate the nature of corresponding technical solutions from the scope of the technical solution in the embodiments of the present disclosure.

What is claimed is:

1. An input device, comprising:
a bracket;
key caps disposed on the bracket; and
a backlight module disposed under the bracket, comprising:
a light guide plate, comprising a plurality of diffusing elements arranged at a position corresponding to an opening of the bracket;
a light source disposed on a side of the light guide plate; and
a shading plate disposed on the light guide plate, wherein the shading plate comprises a transparent sheet, an opaque layer and a translucent coating, the opaque layer is disposed on the transparent sheet correspondingly between two adjacent key caps, and the translucent coating overlaps a portion of the opaque layer on the transparent sheet.

2. The input device of claim 1, wherein the shading plate has a shading area corresponding to a portion of the transparent sheet covered by the opaque layer, and a translucent area corresponding to a portion of the transparent sheet covered by the translucent coating but not covered by the opaque layer.

3. The input device of claim 2, wherein the translucent area is adjacent to the shading area.

4. The input device of claim 2, wherein the shading plate has a transparent area corresponding to a portion of the transparent sheet not covered by the opaque layer, and the shading area surrounds the transparent area.

5. The input device of claim 4, wherein the transparent area is located under the opening of the bracket.

6. The input device of claim 1, a portion of the opaque layer is located within a coverage of the key cap.

7. The input device of claim 1, wherein the backlight module further comprises a reflector disposed under the light guide plate, and the reflector is engaged with an opening of the shading plate corresponding to the opaque layer.

8. The input device of claim 1, wherein the light source is disposed under the opaque layer.

9. The input device of claim 1, wherein the translucent coating is white or whitish.

10. The input device of claim 1, wherein backlight module is semi-transparent at a position corresponding to the diffusing elements.

11. The input device of claim 1, wherein the diffusing elements comprise at least one microstructure disposed on a bottom surface of the light guide plate corresponding to the key caps.

12. The input device of claim 1, wherein the transparent sheet is partially removed to form a hollow portion of the shading plate under one of the key cap.

13. An input device, comprising:
a bracket;
a circuit film disposed on the bracket;
a key cap disposed on the circuit film;
a light source disposed under the bracket; and
a shading plate disposed under the bracket, comprising:
a transparent sheet;
a translucent coating disposed on the transparent sheet and underneath the key cap; and
an opaque layer disposed on a portion of the translucent coating, wherein the shading plate has a shading area corresponding to the opaque layer and a translucent area corresponding to the translucent coating not covered by the opaque layer, and an opening of the shading plate is arranged corresponding to the shading area.

14. The input device of claim 13, further comprising a light guide plate with a plurality of diffusing elements on a bottom surface or a top surface thereof at a position not covered by the opaque layer, and the light source is disposed corresponding to the translucent coating.

15. A backlight module, comprising:
a reflector;
a light guide plate disposed on the reflector, comprising a plurality of diffusing elements;
a light source disposed on a side of the light guide plate; and
a shading plate disposed on the light guide plate, comprising a transparent area, a shading area corresponding to an opaque layer on a transparent sheet, and a white or whitish translucent area corresponding to a translucent coating not covered by the opaque layer, wherein the shading area surrounds the transparent area, and the translucent area is adjacent to the transparent area.

16. The backlight module of claim 15, wherein the diffusing elements comprise at least one microstructure arranged on a bottom surface or a top surface of the light guide plate at a position corresponding to the translucent area or the transparent area.

17. The backlight module of claim 15, wherein the shading plate has an opening corresponding to the shading area.

18. The backlight module of claim 15, wherein the translucent coating is further disposed in the shading area and covered by the opaque layer.

19. The backlight module of claim 18, wherein the light source is disposed under the translucent coating.

20. The backlight module of claim 15, wherein the light source is disposed under the opaque layer.

* * * * *